(12) United States Patent
Zadro

(10) Patent No.: US 10,117,499 B1
(45) Date of Patent: Nov. 6, 2018

(54) AUTOMATICALLY FILLABLE FOGLESS SHOWER MIRROR

(71) Applicant: Zlatko Zadro, Huntington Beach, CA (US)

(72) Inventor: Zlatko Zadro, Huntington Beach, CA (US)

(73) Assignee: ZADRO INC., Huntington Beach, CA (US)

( * ) Notice: Subject to any disclaimer, the term of this patent is extended or adjusted under 35 U.S.C. 154(b) by 178 days.

(21) Appl. No.: 15/193,079

(22) Filed: Jun. 26, 2016

(51) Int. Cl.
*A45D 42/14* (2006.01)
*G02B 27/00* (2006.01)
*A47K 3/28* (2006.01)

(52) U.S. Cl.
CPC ............. *A45D 42/14* (2013.01); *A47K 3/281* (2013.01); *G02B 27/0006* (2013.01)

(58) Field of Classification Search
CPC .................................................. G02B 27/0006
See application file for complete search history.

(56) References Cited

U.S. PATENT DOCUMENTS

| | | | |
|---|---|---|---|
| 5,032,015 A * | 7/1991 | Christianson | A47G 1/02 138/118 |
| 5,953,157 A * | 9/1999 | Christianson | G02B 7/1815 359/507 |
| 6,238,052 B1 * | 5/2001 | Zadro | G02B 7/1815 359/507 |
| 6,799,335 B1 * | 10/2004 | Zadro | G02B 7/1815 359/509 |
| 8,746,901 B1 * | 6/2014 | Zadro | A45D 42/14 359/512 |
| 2011/0170191 A1 * | 7/2011 | Parisi | A45D 42/08 359/509 |

* cited by examiner

*Primary Examiner* — Kimberly N Kakalec
(74) *Attorney, Agent, or Firm* — William L. Chapin

(57) ABSTRACT

An automatically filling fogless shower mirror includes a mirror assembly having a mirror which thermally conductively contacts a water reservoir within the mirror assembly that communicates at the upper end thereof with a water-fill aperture. A tubular automatic water-filling adapter installable between a water supply pipe and a shower head has protruding from the adapter a flexible water supply tube which diverts a small portion of water flowing through the adapter into an inlet opening of the tube, which is discharged from an outlet opening in a distal end of the tube which is removably inserted into the water-fill aperture. Heating of the mirror by warm water in the reservoir prevents fogging caused by condensation of water vapor. Water cooled by warming the mirror trickles from a small drain hole in the reservoir and is continuously replenished by warm water supplied by the automatic water-filling adapter.

16 Claims, 15 Drawing Sheets

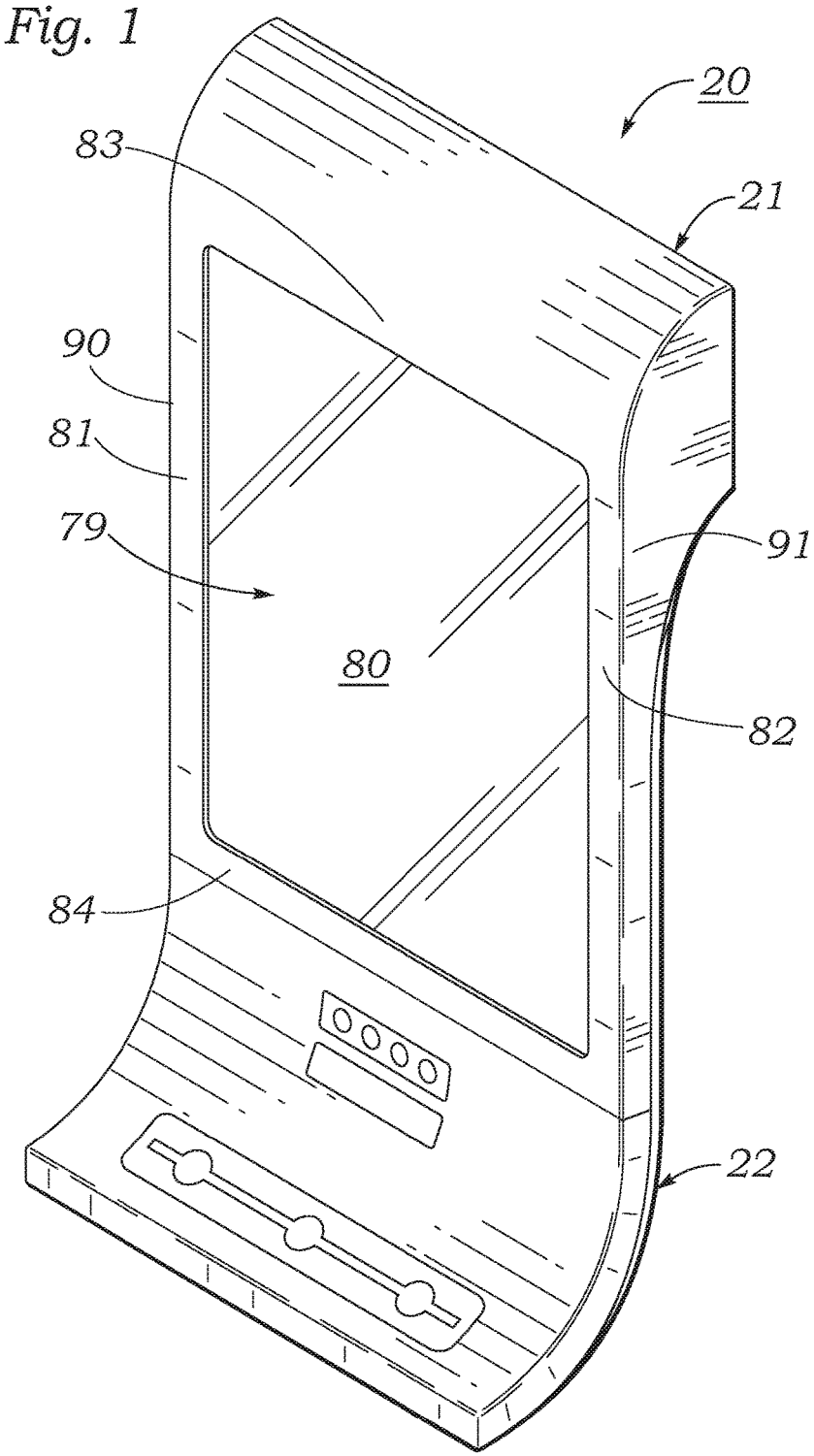

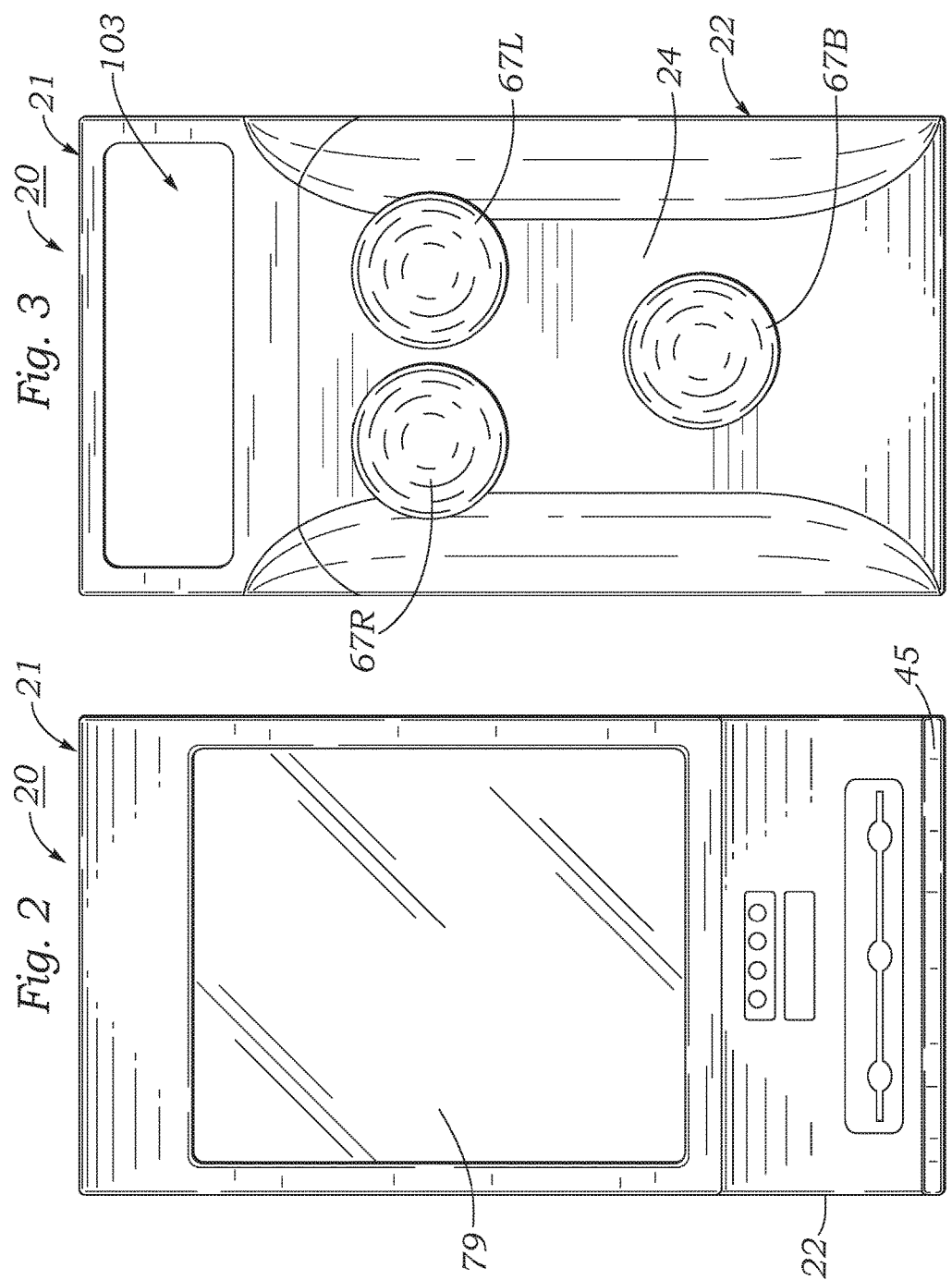

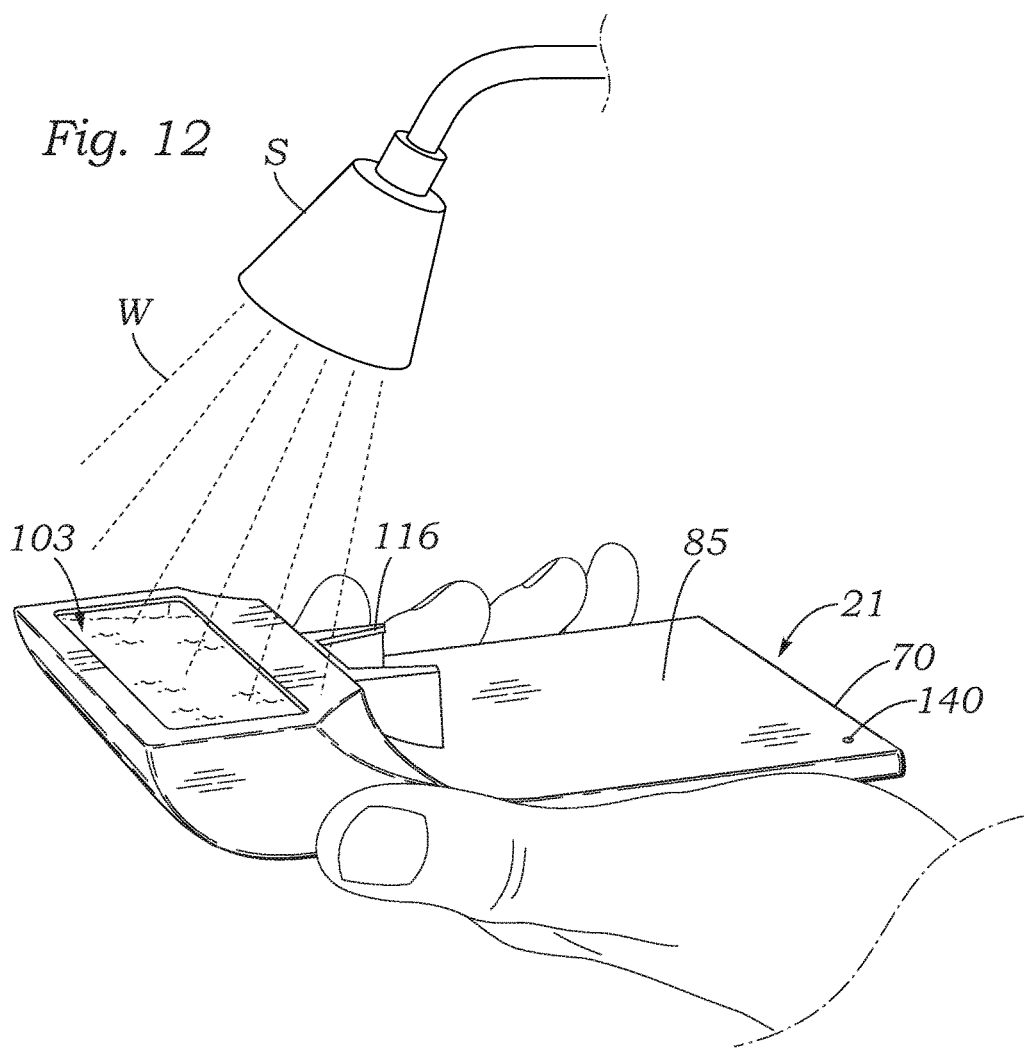

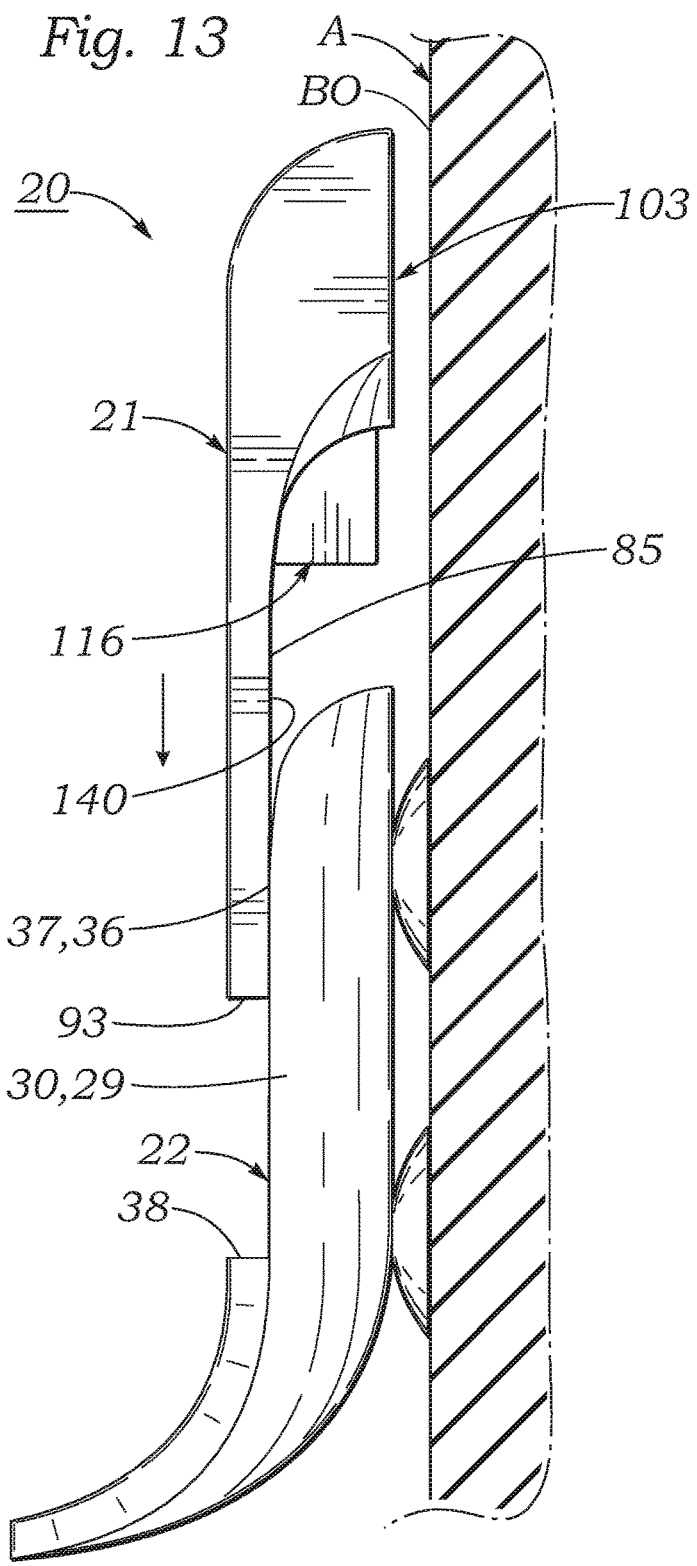

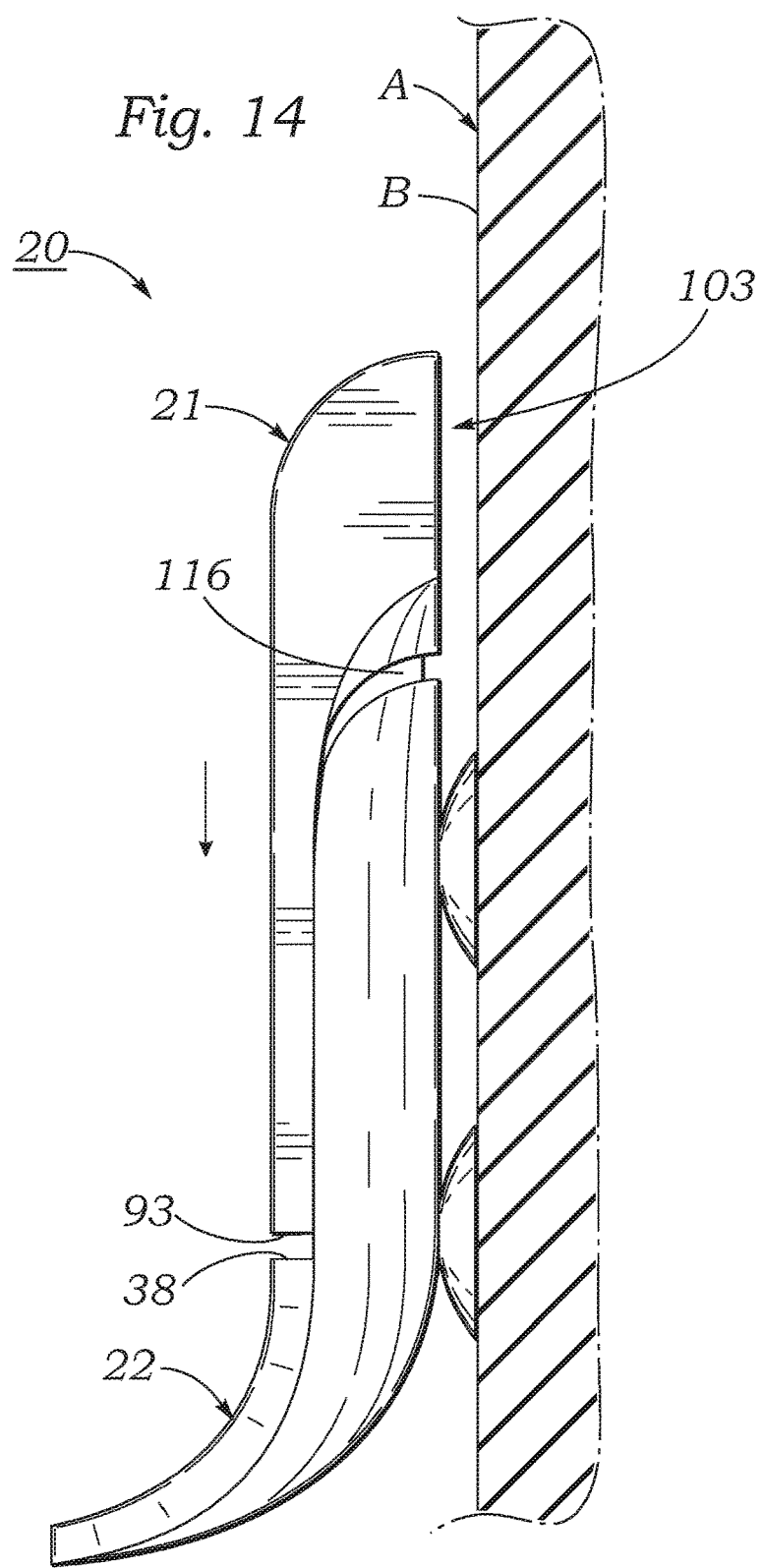

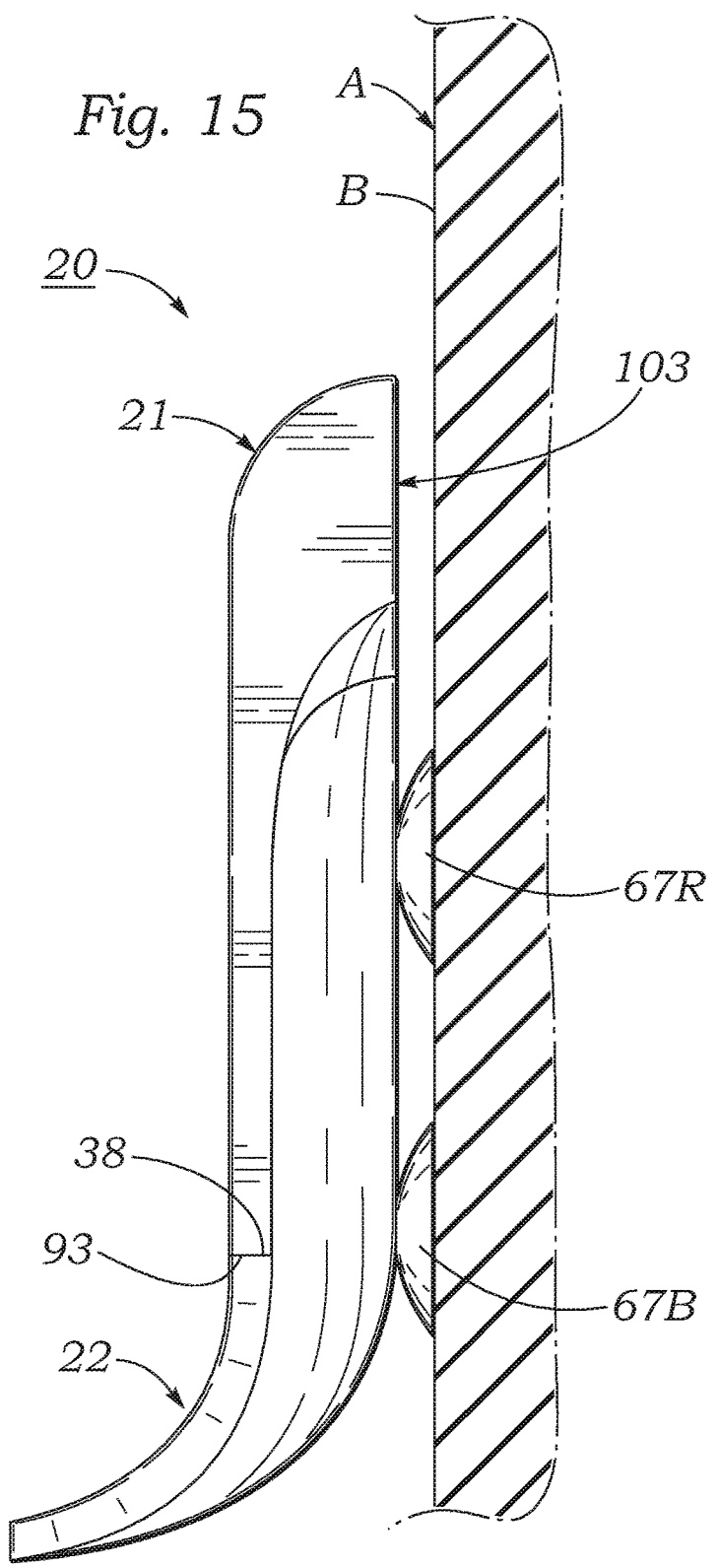

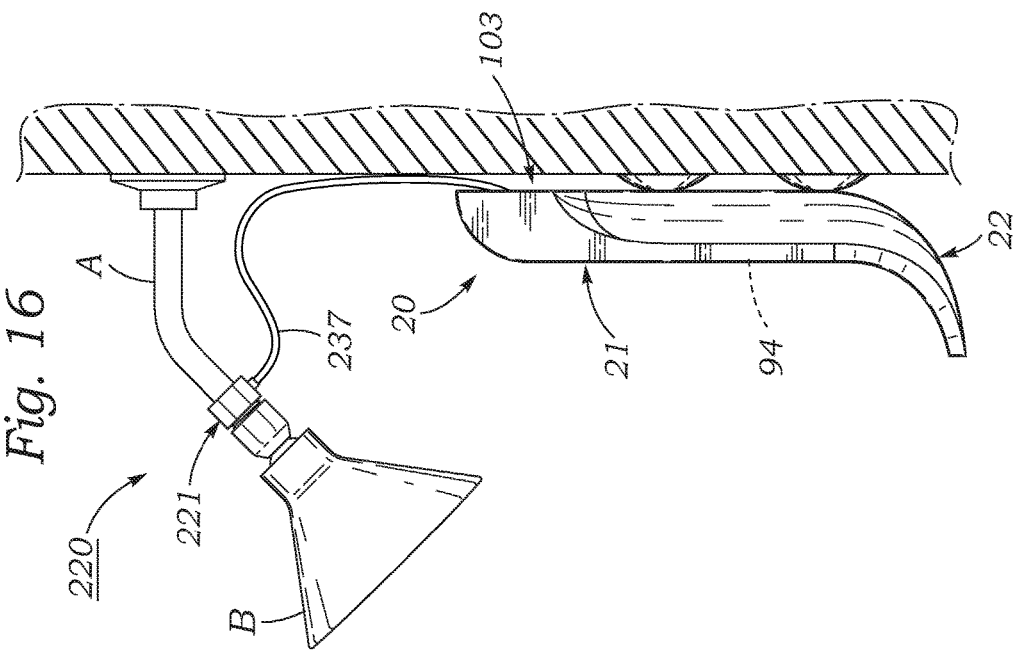
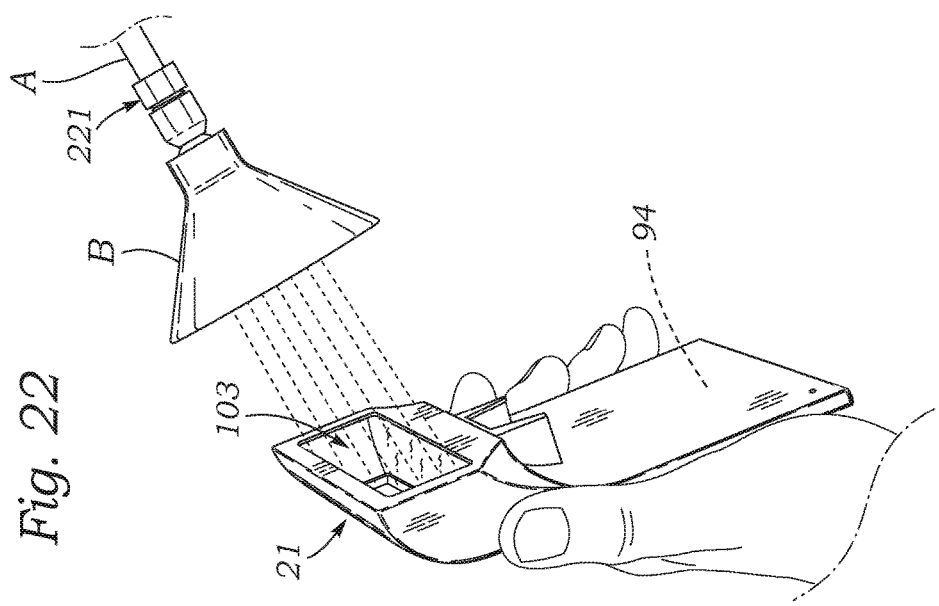

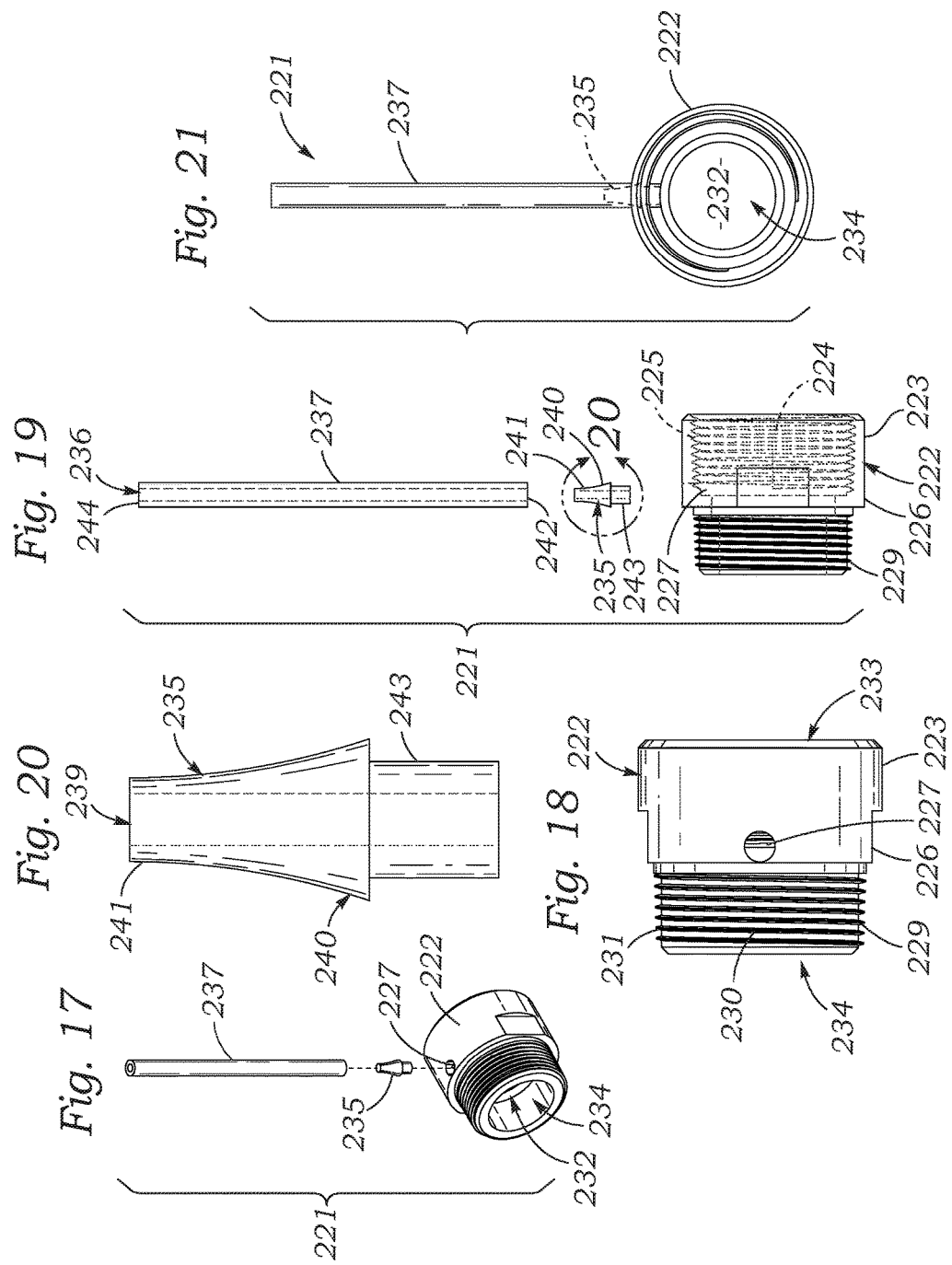

AUTOMATICALLY FILLABLE FOGLESS SHOWER MIRROR

BACKGROUND OF THE INVENTION

A. Field of the Invention

The present invention relates to mirrors of the type used by people as an aid to performing personal grooming tasks such as shaving. More particularly, the invention relates to a fogless shower mirror which includes a mirror assembly that is removable from a support stand and has a reservoir which is manually fillable with warm water from a shower head, or other such source, and re-attachable to the support stand, the warm water warming a mirror plate mounted to the mirror assembly to thus resist formation of image-fogging condensation droplets on the reflective surface of the mirror plate. The fogless shower mirror according to the present invention includes an adapter which enables the reservoir to optionally be automatically and continuously supplied with warm water supplied to a shower head.

B. Description of Background Art

A significant number of people utilize mirrors while showering to facilitate performance of personal care functions such as shaving. However, the use of mirrors in showers was in the past relatively limited, because the warm moist air within a shower enclosure tends to quickly condense on the surface of any mirror used in the shower, obscuring an image of a person's face reflected from the mirror surface so completely as to render the mirror practically useless within a few minutes after a shower has begun.

In response to the problem of moisture condensing on a mirror surface and thereby limiting the usefulness of mirrors in high humidly environments, such as shower enclosures and other locations within a bathroom, the present inventor disclosed in U.S. Pat. No. 4,733,468, issued Mar. 29, 1988, a "fogless" mirror which is highly resistant to formation of condensation droplets on the surface of the mirror. The fogless mirror disclosed in the '468 patent utilizes warm water tapped from the warm water supply pipe to a shower head, to heat the surface of the mirror. Since water vapor in a shower is produced largely by evaporation, the water vapor is always somewhat cooler than the warm water supplied to the shower head. And, since water vapor will condense only on surfaces which are at lower temperature than the vapor, heating the surface of the mirror precludes fogging of the mirror. Therefore, the fogless mirror disclosed in the present inventor's '468 patent proved to be a highly effective solution to the problem of bathroom mirror fogging, and mirrors utilizing the teachings of that patent have been widely marketed and used.

U.S. Pat. No. 4,832,475, Daniels, Non-Fogging Shower Mirror discloses a non-fogging shower mirror which has generally the shape of a hollow rectangular box which has on a front wall thereof a rectangular reflective mirror plate. The back wall of the box is penetrated near the top edge of the wall by a fill hole for receiving warm water from a faucet, when the mirror is unhooked from suction cups which are attachable to a shower wall used to support the box with the mirror vertically oriented. A small cross-section exit port in a bottom wall of the box allows water to drain slowly from the hollow interior space of the box, which serves as a water reservoir.

Because the cross-sectional shape of the water reservoir disclosed in Daniels is uniform, the weight of water required to fill the reservoir increases in direct proportion to the size of the mirror used, and thus potentially causes the suction cup or other support mounting elements to fail. Also, the design of the Daniel's fill port inherently requires that it be small relative to other dimensions of the mirror reservoir box, making filling or manual emptying of the reservoir relatively slow. In response to limitations of prior art non-fogging shower mirrors of the type identified above, the present inventor created an improved Fogless Shower Mirror which is disclosed in U.S. Pat. No. 8,746,901, issued on Jun. 10, 2014. The present invention was created to provide an improved fogless shower mirror which provides a capability for automatically refilling the mirror with warm water.

OBJECTS OF THE INVENTION

An object of the present invention is to provide a fogless shower mirror which includes a mirror assembly that has a reflective mirror plate which is in thermally conductive contact with a reservoir which is fillable with warm water to thus heat the outer surface of the mirror plate to a temperature higher than that of water vapor in a shower enclosure, thereby preventing fogging condensation of the water vapor on the mirror surface, the reservoir being both manually fillable and automatically fillable by means of an adapter connectable to a warm-water supply pipe.

Another object of the invention is to provide an automatically fillable fogless shower mirror which includes a mirror assembly that has a mirror which is thermally connected to an interior water reservoir which is fillable with warm water.

Another object of the invention is to provide an automatically fillable fogless shower mirror which includes a mirror assembly that has a mirror which is thermally conductively connected to a water reservoir which is located within the mirror assembly, and a mirror assembly support stand which supports the mirror assembly in a vertical use position and enables the mirror assembly to be removed from the support stand, filled with warm water, and re-attached to the support stand.

Another object of the invention is to provide an automatically fillable fogless shower mirror which includes a long-thermal time constant, water-fillable mirror assembly removably attached to a mirror support stand.

Another object of the invention is to provide an automatically fillable fogless shower mirror which includes a mirror assembly that is slidably removable from and re-attachable to a mirror support stand, the mirror assembly having a fill port which is nearly as wide as a housing of the mirror assembly, thus facilitating rapid filling, and emptying of a water reservoir within the mirror assembly housing.

Another object of the invention is to provide an automatically fillable fogless shower mirror which includes a mirror assembly that is slidably removable from and re-attachable to a mirror support stand, the mirror assembly housing having mounted in a recess in a front wall thereof a rectangular reflective mirror plate which is in thermally conductive contact with a hollow interior space of the mirror assembly housing which forms a water reservoir, the reservoir having the shape of a rectangular laterally elongated wedge-shaped tube which tapers from a small fore-and-aft thickness near a bottom horizontal edge of the mirror plate, to a larger thickness near the upper horizontal edge of the mirror plate, the tube extending laterally between inner surfaces of laterally opposed vertical side walls of the housing and having at an upper end thereof a laterally elongated, rectangular water entrance opening or mouth which has a fore-and-aft thickness dimension greater than the thickness at the reservoir of the lower horizontal edge of the mirror plate.

Another object of the invention is to provide an automatically fillable fogless shower mirror which includes a mirror assembly that is slidably removable from and re-attachable to a mirror support stand, the mirror assembly housing having mounted in a recess in a front wall thereof a rectangular reflective mirror plate which is in thermally conductive contact with a hollow interior space of the mirror assembly housing which forms a water reservoir, the reservoir having the shape of a rectangular laterally elongated wedge-shaped trumpet-shaped tube which tapers from a small fore-and-aft thickness near a bottom horizontal edge of the mirror plate, to a larger thickness near the upper horizontal edge of the mirror plate, the tube extending laterally between inner surfaces of laterally opposed vertical side walls of the housing and having at an upper end thereof a laterally elongated, rectangular water entrance opening or mouth which has a fore-and-aft thickness dimension greater than the thickness at the reservoir of the lower horizontal edge of the mirror plate, the upper end of the tube curving ninety degrees rearward to thus locate the laterally elongated, rectangular cross-section water-fill mouth in a vertical rear wall surface of the mirror assembly housing, and thus position the mouth close to a wall surface on which the support stand may be mounted.

Another object of the invention is to provide an automatically fillable fogless shower mirror which includes an auto-matic-fill adapter that has a tubular housing which is installable between the outlet port of a shower water supply pipe and a shower head, the tubular adapter having a smaller diameter flexible tube which protrudes from the housing and has a small bore that communicates with a larger water flow bore through the adapter housing, thus diverting a small quantity flow of warm water through the flexible tube and discharging the water through an open end of the tube inserted into a fill port of a warm water reservoir located behind a reflective mirror, thereby automatically supplying the reservoir with a continuous supply of warm water.

Various other objects and advantages of the present invention, and its most novel features, will become apparent to those skilled in the art by perusing the accompanying specification, drawings and claims.

It is to be understood that although the invention disclosed herein is fully capable of achieving the objects and providing the advantages described, the characteristics of the invention described herein are merely illustrative of the preferred embodiments. Accordingly, I do not intend that the scope of my exclusive rights and privileges in the invention be limited to details of the embodiments described. I do intend that equivalents, adaptations and modifications of the invention reasonably inferable from the description contained herein be included within the scope of the invention as defined by the appended claims.

SUMMARY OF THE INVENTION

Briefly stated, the present invention comprehends a fogless shower mirror for use in shower enclosures and other environments which are sufficiently humid to cause water vapor to condense on surfaces of conventional mirrors and thus fog the mirrors and thereby render such mirrors temporarily unuseable.

The fogless shower mirror according to the present invention includes a mirror assembly which has a reservoir for warm water which is manually fillable or optionally automatically fillable by means of an adapter installable between a shower head and water supply pipe, and a mirror support stand for releasably supporting the mirror assembly. The mirror support stand has in front elevation view the shape of a vertically elongated, rectangular elevation view shell which has a generally rectangular rear panel, left and right laterally opposed vertical side panels which extend forward from opposite vertical edges of the rear panels, and a lower laterally elongated rectangular base panel which is disposed laterally between inside surfaces of the vertical side panels, and extends forward from the front surface of the rear panel.

In a preferred embodiment, the mirror support stand according to the present invention has extending downwards and forwards from the lower surface of the base panel thereof an arcuately curved, concave, forwardly extending hollow rectangular cross-section apron section. The apron section has at the lower edge thereof a horizontally forward protruding tray section in which is located a hanger panel laterally centrally located between opposite vertical side walls of the tray. The hanger panel has disposed vertically therethrough a number of apertures for insertably receiving, small elongated objects such as razor handles or tooth brush handles.

The mirror support stand according to the present invention includes a fastener body which protrudes forward from the front surface of the rear panel of the support stand, for slidably engaging and retaining the mirror assembly. This fastener body is formed of four elongated straight rectangular ribs arranged as a regular trapezoidal ring that has a long horizontally disposed base rib, shorter equal length left and right side oblique ribs which angle upwardly at equal acute angles from laterally opposed ends of the base rib, and a horizontally disposed top rib disposed between upper ends of the side ribs. The top rib is located a short distance below the upper horizontal edge of the rear panel of the mirror support stand. Preferably, each of the two oblique side ribs and the top rib has formed in the outer fore-and-aft disposed surface thereof a longitudinally disposed groove.

The mirror support stand also has protruding rearwardly from the rear surface of the rear vertical panel thereof suction cups for releasably attaching the mirror support stand to a smooth vertical wall surface, such as a tiled wall of a shower enclosure.

The mirror assembly according to the invention, includes a uniform width hollow body that has a lower mirror frame section and a curved upper water supply conduit section. The mirror frame section has in front and rear elevation views generally the shape of a uniform width, vertically elongated, rectangular box that has parallel front and rear vertically disposed wall panels. The outline size and shape of the lower mirror frame section of the mirror assembly approximate those of the rear wall panel of the mirror support stand. In side elevation-view, the mirror frame section has generally the shape of a thin, hollow, rectangular slab which has a height approximating that of the rectangular rear wall panel of the mirror support stand.

The front, rear, left and right side wall panels of the mirror assembly have between inner facing surfaces thereof a vertically elongated, rectangularly slab-shaped cavity that serves as a reservoir for holding warm water. A rectangular mirror plate mounted in a rectangular recess which extends into the front surface of the lower rectangular box-shaped mirror frame section of the mirror assembly receives heat from warm water in the reservoir, thus inhibiting formation of condensation droplets on the outer surface of the mirror.

The upper water supply conduit section of the mirror assembly is continuous with and tapers upwardly and rearwardly from the edge of the lower, thin rectangular box-shaped mirror frame section of the mirror assembly. The fore-and-aft thickness of the upper curved section of the mirror assembly tapers to a value near a rear upper end of the water supply conduit which is larger than the thickness of the hollow box-like lower mirror frame section of the mirror assembly, thus forming a curved, funnel-shaped tubular section which has a rectangular transverse cross-section. The funnel-shaped tubular section conformally joins at its lower end the upper end of the rectangular box-shaped water reservoir adjacent to the mirror plate, and thus serves as a water supply conduit for the reservoir.

Upper end parts of the front and rear panels at the upper part of the mirror assembly curve arcuately rearward from their lower parallel vertical orientations, so that the upper ends of the panels are horizontally disposed.

The rear vertically disposed edges of the horizontally disposed curved upper ends of the front and rear panels of the upper curved water conduit section of the mirror assembly join the front surface of a vertical water-fill aperture panel which is parallel to the lower vertical parts of the front and rear panels. The water-fill aperture panel has through its thickness dimension a laterally elongated, rectangularly-shaped water-fill aperture which communicates with the rectangular cross-section, curved tubular water supply conduit that is formed between upper ends of the front, rear, left and right side panels of the curved upper section of the mirror assembly. The water-fill aperture is circumscribed by upper, lower, left and right flat vertically disposed flange walls which are continuous with the rear aperture panel and extend radially inwards of outer surfaces of the upper ends of the respective front, rear, left and right wall panels.

The mirror assembly has protruding horizontally rearwards of an upper part of the rear panel of the mirror assembly a fastener boss for releasably connecting to the trapezoidal ring fastener body of the mirror support stand. The fastener boss has a pair of laterally opposed, vertically disposed support plates which are located equidistant from opposite sides of a vertical center plane of the mirror assembly. The support plates support at outer vertical edges thereof a transversely disposed vertical fastener plate which is located below and a short distance inwards or forwards of the water-fill aperture panel.

The rear vertical fastener plate has generally the shape of a rectangular plate which has extending upwardly into the plate from a lower horizontally disposed edge thereof a laterally centrally located notch that has the shape of a regular trapezoid.

Thus, the vertical fastener plate has an upper laterally disposed rectangularly-shaped plate section which has a lower straight laterally disposed edge. The fastener plate also has protruding vertically downwards from laterally opposed ends thereof a pair of wedge-shaped left and right side fastener plate sections. Each side fastener plate section has an inner facing oblique edge which extends obtusely downwardly and laterally outwards from the lower laterally disposed edge of the upper plate section. Thus arranged, the mirror assembly fastener boss has formed between the three plate sections thereof an upwardly concave, trapezoidally-shaped opening of the proper size and shape to be slidable in an interference fit into the grooves in the outer surfaces of the top rib and side ribs of the trapezoidal ring fastener body of the mirror support stand. In a preferred embodiment the mirror assembly fastener plate sections are thin, uniform thickness flange sections of a hollow rectangular cross-section boss which protrudes rearwardly from the rear surface of the upper curved part of the rear wall of the mirror assembly reservoir.

With the foregoing construction, the mirror assembly may be slidably moved upwards relative to the mirror support stand fastened to a shower wall, and removed from the mirror support stand. The mirror assembly may then be rotated to a horizontal position, with the water-fill mouth facing upwards, and the water reservoir of the mirror assembly filled by positioning the water-fill mouth in a stream of warm water issuing from a source such as a shower head.

After the mirror assembly water reservoir has been filled with warm water, the mirror assembly is slidably re-attached to the mirror support stand. In this position, the water-fill aperture is vertically oriented and in close parallel proximity to a shower wall to which the mirror support stand is attached. This novel construction ensures that the rate of convective heat loss from warm water in the mirror reservoir is maintained at a low level. The low rate of connective heat loss in turns results in a mirror assembly and mirror support assembly that has a long thermal time constant.

The mirror assembly according to the present invention preferably includes a small diameter water drain hole which penetrates the rear reservoir panel near the lower edge of the panel. Reservoir water cooled by transferring heat to the mirror is replenished by warm water from the reservoir supply conduit. Thus, the reflective surface of the mirror plate is maintained fogless for more than an adequate time period for a user to view fogless images in the mirror while personal care functions are performed, e.g., about 30 minutes.

The automatically fillable fogless shower mirror according to the present invention includes an automatic-fill adapter that has a tubular housing which is installable between the outlet port of a shower water supply pipe and a shower head, the tubular adapter having a smaller diameter flexible tube which protrudes from the housing and has a small bore which communicates with a larger water flow bore through the adapter housing, thus diverting a small quantity flow of warm water through the flexible tube and discharging the water through an open end of the tube inserted into a fill port of a warm water reservoir located behind a reflective mirror, thereby automatically supplying the reservoir with a continuous supply of warm water.

BRIEF DESCRIPTION OF THE DRAWINGS

FIG. 1 is a front perspective view of a long thermal time constant, warm-water fillable fogless shower mirror and support stand according to the present invention.

FIG. 2 is a front elevation view of the mirror and support stand of FIG. 1.

FIG. 3 is a rear elevation view of the mirror and support stand of FIG. 1.

FIG. 12 is a side perspective view of the mirror of FIGS. 1 and 9 separated from the support stand as shown in FIG. 8, oriented horizontally and being filled with warm water from a shower head.

FIG. 13 is a side elevation view showing the mirror of FIGS. 1 and 8 slid vertically downwards into partial engagement with the support stand of the article.

FIG. 14 is a view similar to that of FIG. 12, but showing almost complete engagement of the mirror within the support stand.

FIG. 15 is a view similar to that of FIG. 13, showing complete engagement of the mirror within the support stand.

FIG. 16 is a side elevation view of an Automatically Fillable Fogless Shower Mirror according to the present invention.

FIG. 17 is an exploded perspective view of an automatically filling adapter component of the mirror of FIG. 16.

FIG. 18 is a fragmentary side elevation view of the adapter of FIG. 17 on an enlarged scale, showing a tubular housing of the adapter.

FIG. 19 is an exploded side elevation view of the adapter of FIG. 17, showing the tubular housing thereof partly in section.

FIG. 20 is a fragmentary view of the adapter of FIG. 19, showing an enlarged view of a tapered tubular side port fitting of the adapter.

FIG. 21 is a front end elevation view of the adapter of FIG. 17.

FIG. 22 is a perspective view showing how the fogless shower mirror of FIG. 16 may optionally be removed from a support stand therefore and manually filled with warm water issuing from a shower head.

DESCRIPTION OF THE PREFERRED EMBODIMENT

FIGS. 1-15 illustrate a basic embodiment of a Fogless Shower Mirror 20 according to the present invention.

FIGS. 16-22 illustrate an automatically fillable modification of the Fogless Shower Mirror according to the present invention.

Figure 7:
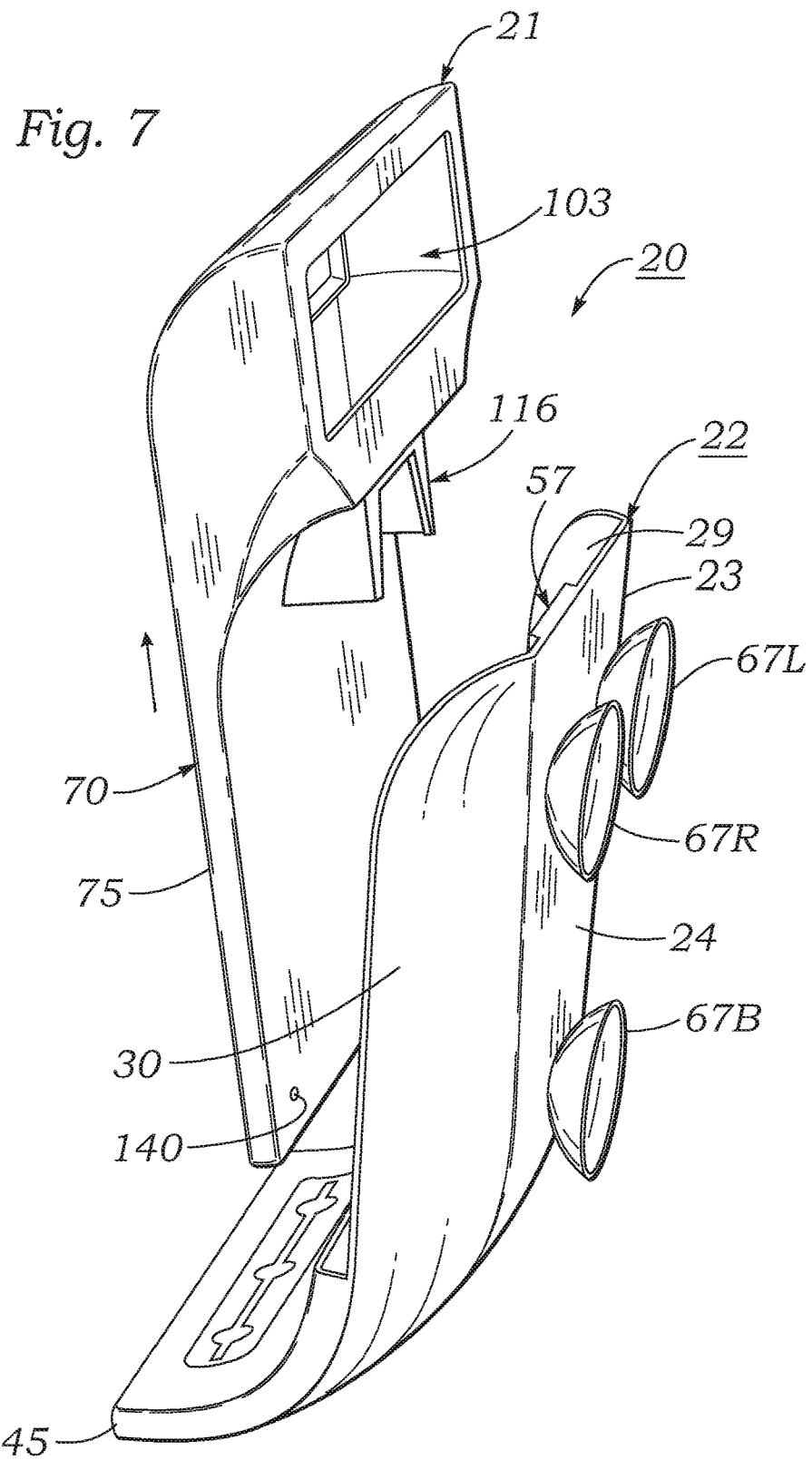
FIG. 7 is a side perspective view showing the mirror of FIG. 5 partially removed from the support stand.
Figure 8:
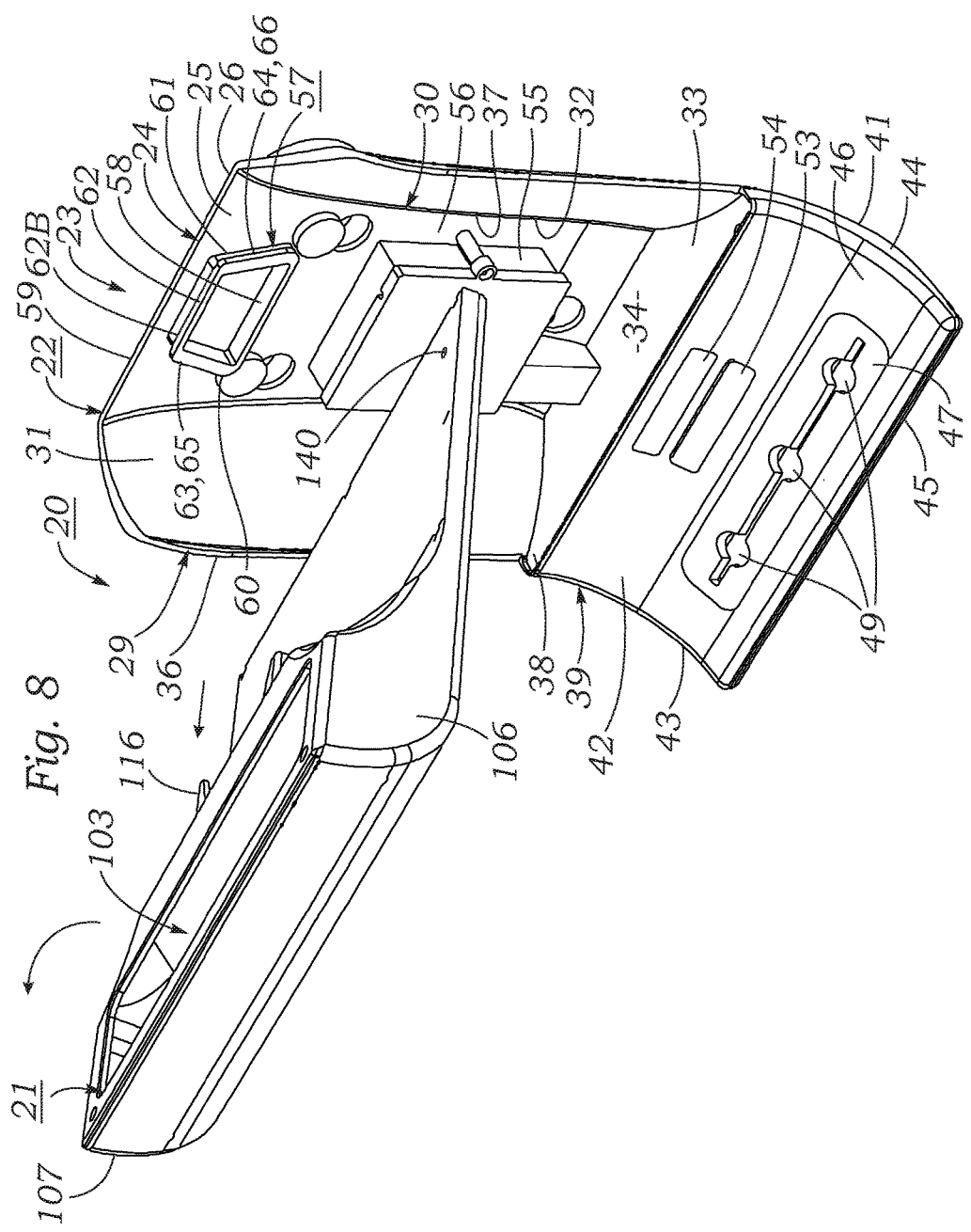
FIG. 8 is a front perspective view showing the mirror of FIGS. 1 and 7 fully removed from its support stand.

Referring now to FIGS. 1, 7 and 13, it may be seen that a fogless shower mirror 20 includes a mirror assembly 21 which is slidably attachable to and removable from a mirror support stand 22 that is releasably attachable to a flat surface, such as the outer surface B of a shower enclosure wall A. As shown in FIGS. 7 and 8 mirror assembly 21 is slidably removable from mirror support stand 21. And, as shown in FIGS. 13-15, mirror assembly 21 is slidably re-attachable to mirror support stand 22. The structure and function of fogless shower mirror 20 may be best understood by first considering the construction of mirror support stand 22.

Referring now to FIGS. 1-8, it may be seen that the support stand 22 for mirror assembly 21 of fogless shower mirror 20 includes an upper part 23 which has in front elevation view the shape of a vertically elongated, generally rectangular trough-shaped shell. The upper, generally vertically disposed, shell-shaped part 23 of mirror support stand 22 includes a rear panel 24 which has a vertically elongated rectangular outline. Panel 24 has a generally uniform thickness and flat and parallel front and rear, outer surfaces 25 and 26, respectively.

As shown in FIG. 8, rear panel 24 of upper shell-shaped part 23 of mirror support stand 22 has protruding from opposite left and right vertically disposed edges 227, 28 thereof left and right vertically disposed side panels 29, 30. Side panels 29, 30 have generally the shape of thin, uniform thickness, vertically elongated rectangular panel strips which are disposed at oblique angles laterally outwards and forwards from the vertical edges 27, 28 of the rear panel 24. As shown in FIG. 8, side panels 29, 30 preferably have arcuately curved convex front surfaces 31, 32, respectively.

As shown in FIG. 8, the upper shell-shaped part 23 of mirror support stand 22 includes a laterally disposed base panel 33. Base panel 33 has a flat upper surface 34 which extends forward from the flat front, surface 25 of rear panel 24. As shown in FIG. 8, base panel 33 has a straight, laterally disposed front edge 35 which is located forward of the front vertical edges 36, 37 of left and right vertical side panels 29, 30. This construction forms on upper surface 34 of base panel 33 a narrow "front porch" or ledge 38 which serves as a support surface for mirror assembly 21, as shown in FIG. 13.

As shown in FIGS. 1, 4, 7 and 8, mirror support stand 22 of fogless shower mirror 21 has a lower curved part 39 which has the same uniform width as that of upper shell-shaped part 23 of the mirror support stand 22. As may be seen best by referring to FIG. 4, the lower curved part 39 of mirror support stand 22 has generally the shape of an arcuately curved apron which curves arcuately downwardly and forwardly from the laterally disposed ledge 38 at the lower end of the hollow interior space 40 formed between the rear panel 24, the left and right side panels 29 and 30 and the base panel 33 of the upper shell-shaped part 23 of the mirror support stand.

Figure 4:
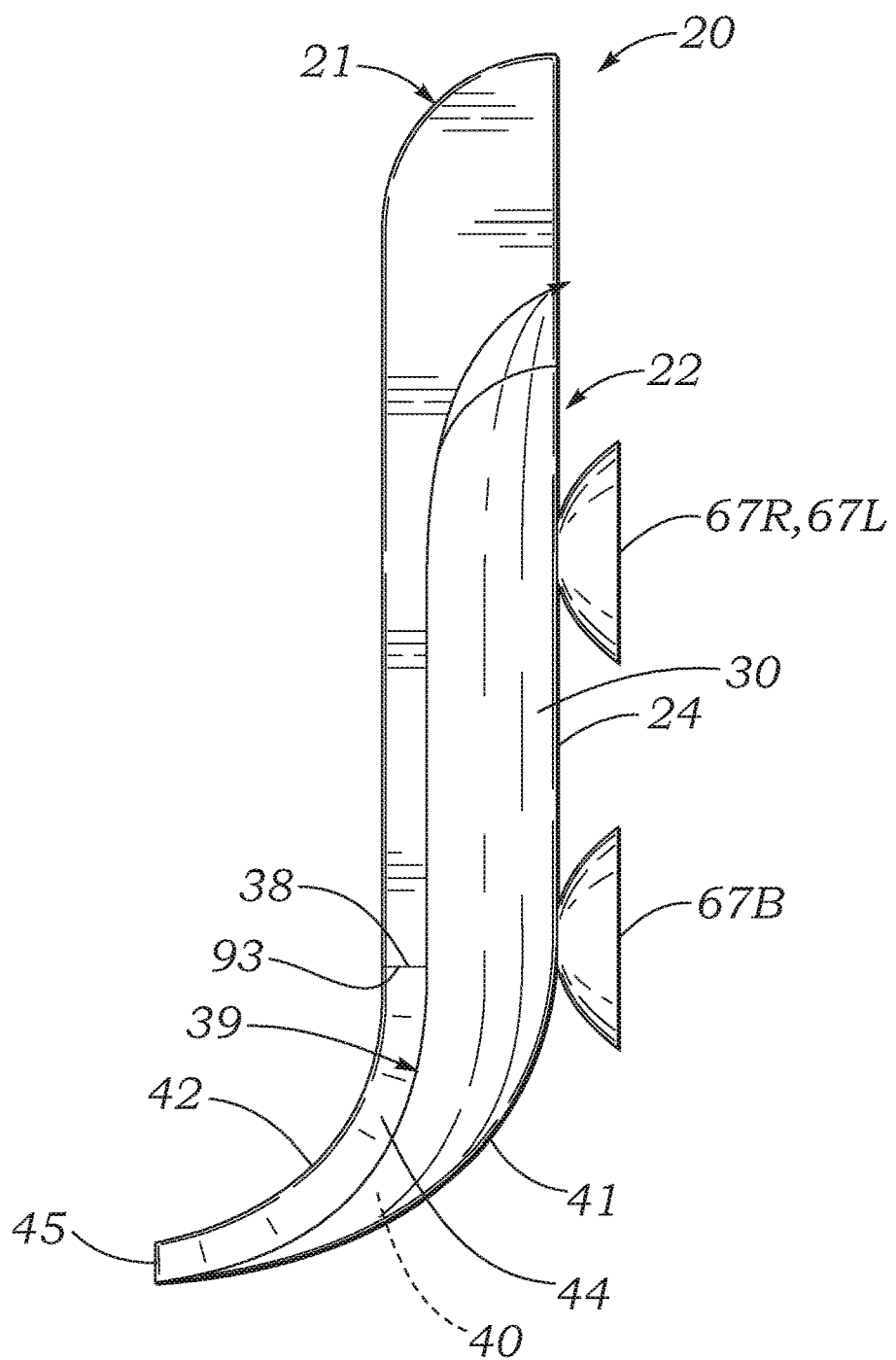
FIG. 4 is a right side elevation view image of the right side elevation view of the mirror and support stand of FIG. 1.
Figure 5:
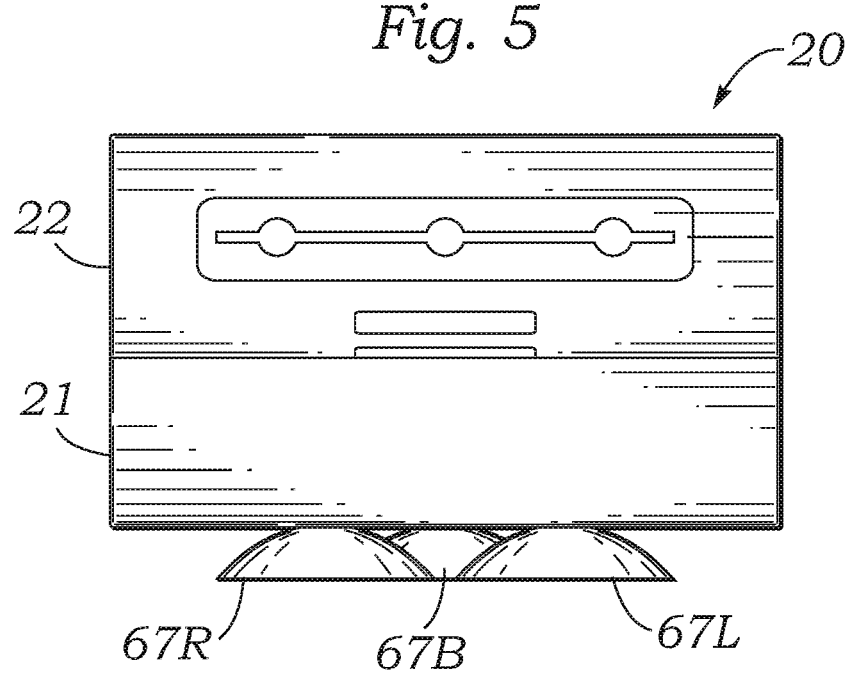
FIG. 5 is an upper plan view of the mirror and support stand of FIG. 1.
Figure 6:
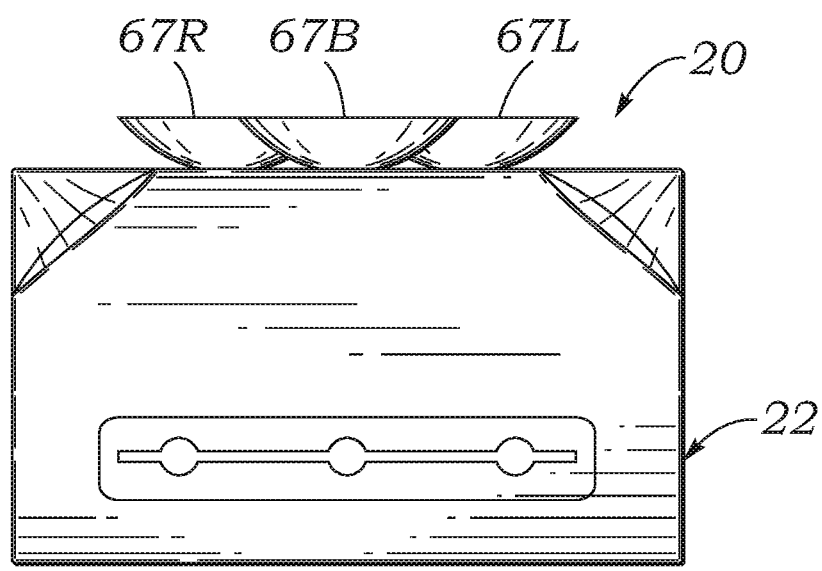
FIG. 6 is a lower plan view of the mirror and support stand of FIG. 1.

As shown in FIGS. 4 and 8, the rear wall of lower apron-shaped section 39 of mirror support stand 22 is formed by an arcuately downwardly and forwardly curved continuation 41 of upper section rear panel 24. Lower apron section 39 of mirror support stand 22 also has a front wall 42 which is shaped similarly to curved rear wall panel 41. The front and rear walls 42, and 41 are joined at an upper horizontal end thereof by ledge 38, at left and right sides thereof by left and right curved flange walls 43, 44, and at a lower end thereof by a lower laterally disposed flange wall 45.

As may be seen best by referring to FIGS. 1, 5, 6 and 8, apron section 39 of mirror support stand 22 preferably includes an article hanger panel 46 for supporting small articles such as razors. Article hanger panel 46 includes a laterally elongated, rectangularly-shaped support strip 47 which is made of resilient material such as silicone rubber. Support strip 47 has through its thickness dimension a row of laterally spaced apart holes 49 for receiving articles such as razor handles, and is fitted conformally into a rectangularly-shaped aperture 50 which extends through the thickness dimension of a front laterally disposed tray part 51 of the apron section. As shown in FIG. 1, apron section 39 also optionally has in an upper part thereof control panels 53, 54 for an optional radio 55 which is mounted on the front surface 56 of rear panel 24, as shown in FIG. 8.

As may be seen best by referring to FIG. 8, the mirror support stand 22 according to the present invention includes a fastener body 57 which protrudes perpendicularly forward from the front surface 25 of rear panel 24 of the support panel. Fastener body 57 is formed of straight, elongated rectangular cross-section ribs which are arranged as a ring that has the outline shape of a regular trapezoid.

Fastener body 57 has a relatively long, horizontally disposed base rib 58 which is located a short distance below the upper horizontal edge 59 of rear panel 24. Base rib 58 is laterally centered between left and right vertical side panels 29, 30 of mirror support stand 22, and has shorter equal length left and right oblique side ribs 60, 61 which angle acutely upwards from opposite ends of the base rib. Ring-shaped fastener body 57 also includes a top rib 62 which is disposed horizontally between the upper ends of oblique side ribs 60, 61. Top rib 62 is located a short distance below the upper horizontal edge 59 of rear panel 24.

Referring still to FIG. 8, it may be seen that left and right oblique side ribs 60, 61 of ring-shaped fastener body 57 have formed in outer fore-and-aft disposed surfaces 63, 64 thereof a longitudinally disposed groove 65, 66, respectively. Optionally, fore-and-aft disposed, upper surface 62A of top rib 62 also has formed therein a longitudinally disposed groove 62B.

As shown in FIGS. 3-8, mirror support stand 22 includes suction cups 67 for releasably attaching the support stand to a vertical support surface, such as the surface B of a tile shower wall A, as shown in FIGS. 13-15. Thus, as shown in FIGS. 3-7 and 11, mirror support stand 22 includes three suction cups arranged in a triangular pattern, consisting of left and right upper suction cups 67L, 67R, and bottom suction cup 67B, which are mounted in holes 68L, 68R, 68B and protrude rearward from the rear surface of rear panel 24 of upper panel 23 of the mirror support stand.

The structure and function of mirror assembly 21 of fogless shower mirror 20 may be best understood by referring to FIGS. 7-10.

Referring now to FIGS. 1, 7-10, it may be seen that mirror assembly 21 of fogless shower mirror 20 has in front and rear elevation views generally the shape of a rectangular outline, vertically elongated hollow body 70. Body 70 has left and right flat, parallel vertically disposed sides 71, 72, an upper horizontally disposed side 73, and a lower horizontally disposed side 74.

Figure 10:
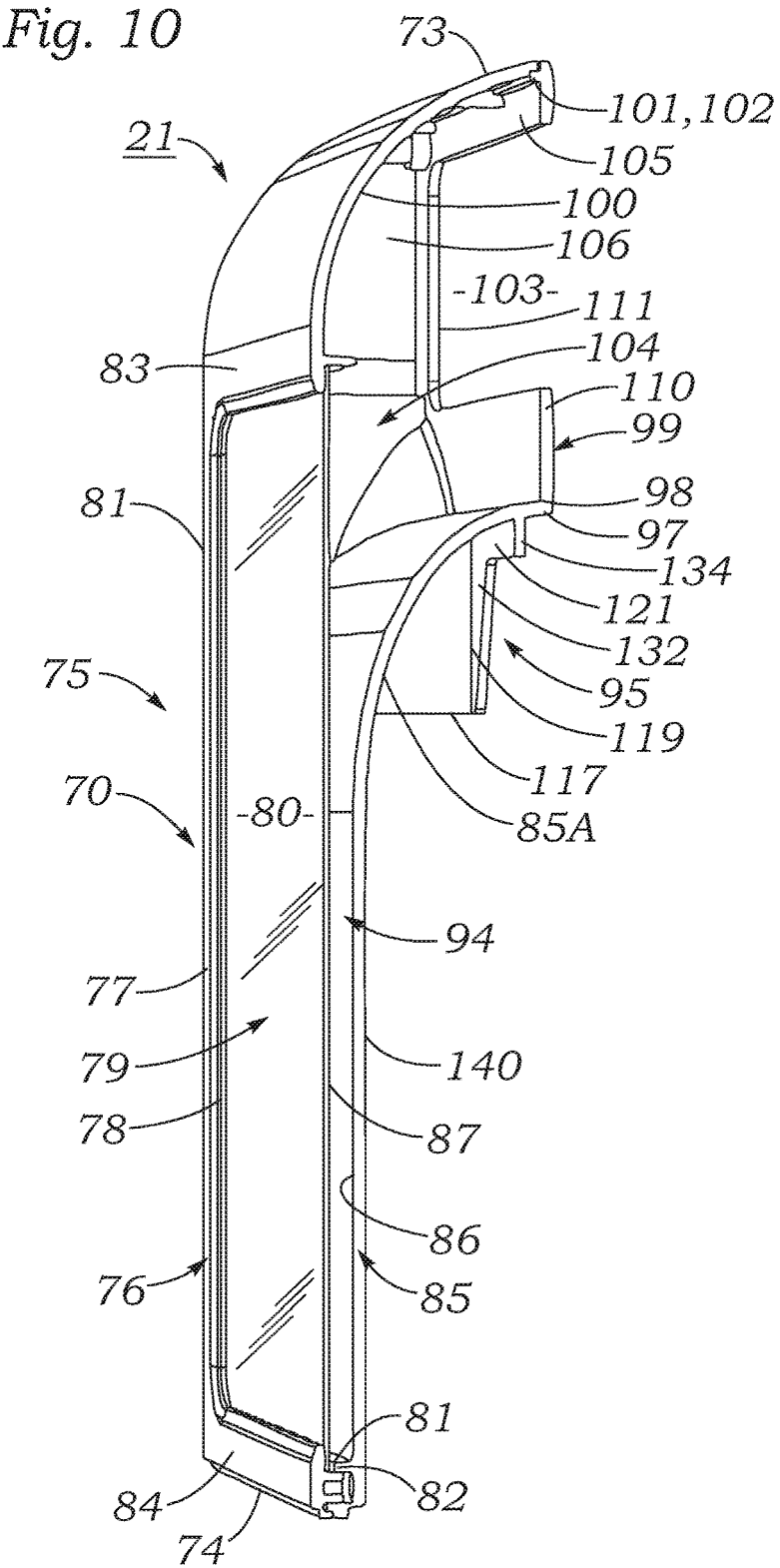
FIG. 10 is a longitudinal vertical medial sectional view of the mirror of FIG. 9, taken in the direction 10-10.
Figure 11:
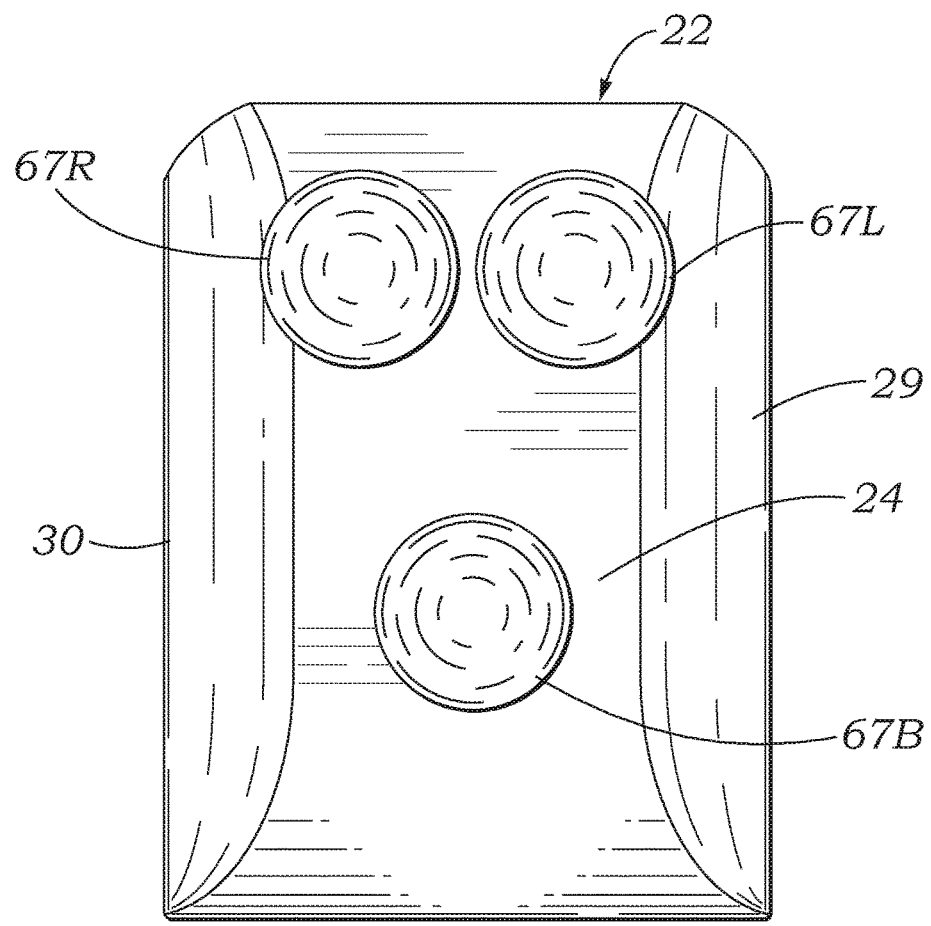
FIG. 11 is a rear elevation of the support stand of the mirror of FIGS. 1, 7 and 9.

As shown in FIGS. 1, 2 and 10, body 70 has a lower, relatively long vertically elongated rectangularly box-shaped mirror frame section 75. Lower mirror frame section 75 of mirror assembly body 70 has a flat rectangularly-shaped front wall panel 76 which has formed in the front flat surface 77 thereof a vertically elongated, rectangularly-shaped recess 78. Rectangular recess 78 occupies a substantially large area of front surface 77 of mirror frame section 75 of body 70, and has mounted conformally therein a rectangular mirror plate 79 whose outer planar front surface 80 is substantially flush with front surface 77 of the mirror frame section. As shown in FIGS. 1 and 10, unrecessed portions of front surface 77 of mirror frame section 75 that border recess 78 and mirror plate 79 form left, right, upper and lower rectangular-shaped bezel ribs 81, 82, 83 and 84, respectively.

Figure 9:
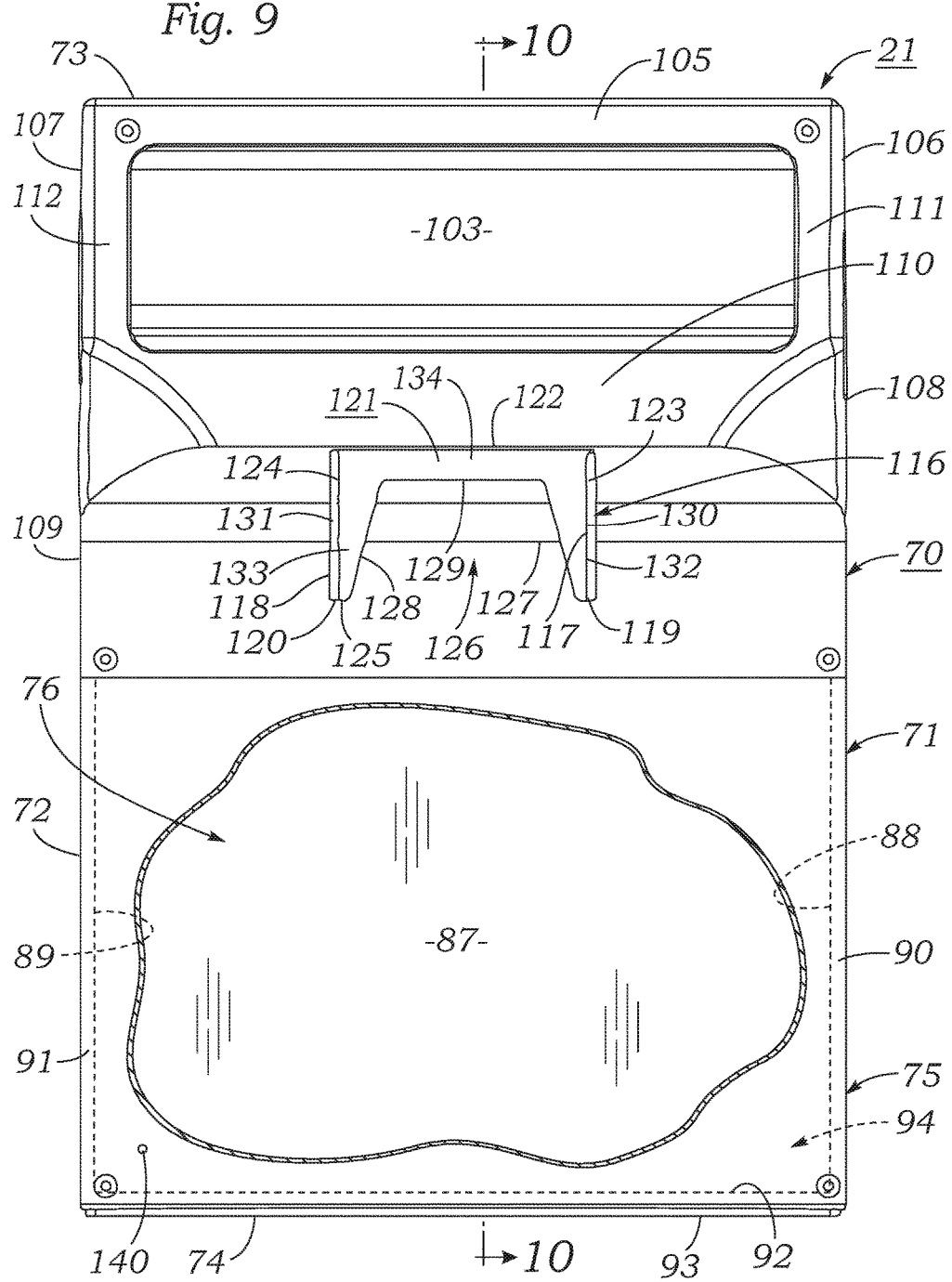
FIG. 9 is a partly broken away rear elevation view of the mirror of FIGS. 7 and 8, showing the mirror fully removed from the support stand.

Referring now primarily to FIGS. 9 and 10, it may be seen that the mirror frame section 75 of mirror assembly body 70 has a vertically elongated rectangular rear panel wall 85 parallel to front wall panel 76. Rear wall panel 85 has a front, inner surface 86 which is positioned in close parallel proximity to rear, inner surface 87 of front wall panel 76 of mirror frame section 75 of mirror assembly body 70. As shown in FIG. 10, inner surfaces 88, 89 of left and right vertical side webs 90, 91 of mirror frame section 75, upper, inner surface 92 of lower web section 93, front inner surface 86 of rear panel 85, and rear inner surface 87 of front panel 76 of the r mirror frame section form therebetween a vertically elongated, thin, rectangular slab-shaped cavity 94 which serves as a reservoir for warm water.

As may be best by referring to FIGS. 7-10, body 70 of a mirror assembly 21 has a rearwardly curved upper end 95 which is continuous with lower mirror frame section 75 of the body. The spacing between the front upper curved extension of front and rear panels 76, 85 of lower box-shaped mirror frame section 75 of mirror assembly 21 tapers outwardly at the upper end part 95 of the mirror assembly, so that the thickness of the upper part of the reservoir 94 located between the front and rear panels is greater than that of the lower part of the reservoir.

Thus, as shown in FIGS. 7-10, an upper end portion 85A of rear panel 85 curves arcuately rearwards away from front panel 76, thus increasing the fore-and-aft thickness dimension of reservoir 94 from the thickness of the lower part of the reservoir. An upper laterally disposed edge 97 of upper curved end portion 85A of rear mirror panel 85 joins the lower laterally disposed edge 98 of a rectangularly-shaped vertical aperture plate 99 which is located rearward of rear wall panel 85.

As is also shown in FIGS. 7-10, an upper end part 100 of front mirror assembly panel 76 curves arcuately rearwards from the lower vertical part of the front panel so that the outer end of the upper part is angled upwardly at a small angle from the horizontally disposed outer end 97 of curved upper extension 85A of rear panel 85. The rear laterally disposed edge 101 of curved upper end part 100 of the front mirror assembly wall panel 76 joins and is co-extensive with the upper laterally disposed edge 102 of rear vertical aperture plate 99.

As may be seen best by referring to FIGS. 7, 9 and 10, aperture plate 99 has through its thickness dimension a laterally centered, laterally elongated rectangularly-shaped water-fill aperture 103. Water-fill aperture 103 communicates with an upper outwardly-flaring tubular extension 104 of the hollow water reservoir compartment 94 of mirror assembly 21. Tubular extension 104 has the shape of a curved, rectangular cross-section funnel and serves as a warm water supply conduit for reservoir 94. Water-fill aperture 103 is bordered on an upper laterally disposed edge of the aperture by an upper, thin, laterally elongated rectangularly-shaped section 105 of the aperture plate 99 which constitutes an upper aperture flange wall that extends between opposite enlarged upper, rearwardly curved and widened extensions 106, 107 of left and right wide walls 108, 109 of the mirror assembly. Water-fill aperture 103 is also bordered on a lower laterally disposed edge of the aperture by a lower flange wall 110 which has a greater vertical width than upper flange wall 105. Aperture 103 is also bordered on left and right sides thereof by thin left and right vertically disposed flange walls 111, 112, which protrude laterally inwards from outer faces 113, 114 of side walls 108, 109.

Referring to FIGS. 7, 9 and 10, it may be seen that upper part 95 of mirror assembly 21 has protruding rearwardly from the rear surface 115 of the curved upper end portion 85A of rear mirror housing panel 85 a fastener boss 116 for releasable engagement with the fastener body 57 which protrudes forward from mirror support stand 22. As shown in the figures, fastener boss 116 includes a pair of Laterally spaced apart parallel, vertical, fore-and-aft disposed left and right side support plates 117, 118 which are located equidistant from opposite sides of a vertical center plane of the mirror assembly. The side support plates 117, 118 support at rear vertical edges 119, 120 thereof a transversely disposed rear vertical fastener plate 121.

As shown in FIGS. 9 and 10, rear vertical fastener plate 121 has generally the shape of rectangular plate which has a straight, laterally disposed upper edge 122, and straight, vertically disposed left and right side edges 123, 124 which depend perpendicularly downwards from laterally opposed outer ends of the upper edge. Rear vertical fastener plate 121 has extending upwards into the plate from a lower horizontally disposed edge 125 thereof a relatively wide, relatively rear laterally centrally located notch 126. Notch 126 has the outline shape of a regular trapezoid with laterally opposed inner facing left and right oblique side edges 127, 128. The left and right side oblique edges 127, 128 of rear vertical fastener plate 121 extend obtusely downwards from an upper horizontally disposed edge wall 129 of the notch, and thus form with left and right outer vertical edges 130, 131 of the rear vertical fastener plate left and right wedge-shaped side fastener plate sections 132, 133.

Thus constructed, the mirror assembly fastener boss 116 has three fastener plate sections including an upper horizontally disposed rectangular plate section 134, and left and right wedge-shaped fastener plate sections 132, 133. The inner facing edges of the upper rectangular plate section 134 and left and right wedge-shaped plate sections 132, 133 form therebetween an upwardly concave, trapezoidally-shaped opening 135 of the proper size and shape to slidably receive upwardly therein the trapezoidal ring-shaped fastener body 57 which protrudes forward from mirror support stand 22. Moreover, the inner facing edges of the fastener plate sections are of the proper size and shaped to be slidable in interference fits into the grooves in the outer surfaces of oblique side ribs and upper rib of the trapezoidal ring-shaped mirror assembly fastener body 57.

FIGS. 3, 7, 8 and 12-15 illustrate a preferred method of using the fogless shower mirror 20 according to the present invention.

First, as shown in FIGS. 3 and 15, shower mirror 20 including mirror assembly 21 slidably attached to mirror support stand 22 is releasably mounted to the surface B of a wall A, such as an interior tile wall of a shower enclosure. Mounting is accomplished by pressing rearward on the front surface of the mirror assembly and support stand with sufficient force for the suction cups 67L, 67R and 67 B protruding from the rear surface 24 of mirror support stand 22 to resiliently flatten against surface B of wall A. Resilient deformation of the suction cups exhausts air from the rearwardly facing concave depressions in the suction cups. Since the rear surface of the outer peripheral edge of each suction cup resiliently contacts and hence forms a hermetic seal with the wall surface, when rearward pressure on the suction cups is released, a partial vacuum is formed within the concave cavity in each suction cup. Pressure of the atmosphere exerted on outer surfaces of each suction cup thus exerts a rearwardly directed force on the suction cup which maintains a hermetic seal between the resilient outer annular edge portion of the suction cup and mounting surface A, thus pneumatically adhering the suction cups to the surface and thereby supporting the mirror support stand 22 and attached mirror assembly 21 in a vertically-mounted position on wall A, as shown in FIG. 15.

After mirror support stand 22 and attached mirror assembly 21 have been mounted onto a wall A, as shown in FIG. 15, the mirror assembly may be removed from the mirror support stand by grasping the mirror assembly and pulling it upwardly from the mirror support stand, as shown in FIGS. 14, 13 and 7. As shown in FIGS. 8 and 12, mirror assembly 21 is then rotated to a substantially horizontal orientation. As shown in FIG. 12, mirror assembly is then conveyed to a location near a source of warm water, such as a stream of water W issuing from a shower head S, and the stream directed into water fill aperture 103 on the rear side of mirror assembly 21.

After reservoir 94 within body 20 of mirror assembly 21 has been filled with warm water, the mirror assembly 21 is moved back towards mirror support stand 22 and tilted upwards towards a vertical use position, as shown in the sequence of FIGS. 12, 8 and 7. Then, as shown in FIGS. 13, 14 and 15, a lower part of rear surface 140 of rear mirror assembly panel 85 is positioned against upper parts of the front edges 36, 37 of left and right side panels 29, 30 of mirror support stand 22. Mirror assembly 21 is then slid downwards until fastener body 57 which protrudes forward from mirror support stand 22 is slidably received within the fastener boss 116 that protrudes rearwardly from mirror assembly 22. As shown in FIGS. 14 and 15, mirror assembly 21 is then slid downwards relative to mirror support stand 22 until the lower horizontal edge 93 of the mirror assembly seats on ledge 39 of mirror support stand. Thus positioned, water-fill aperture 103 of mirror assembly lies in a vertical plane which is in close proximity to vertical surface B of wall A.

As shown in FIGS. 7, 8, 9 and 10, rear panel 85 of body 70 of mirror assembly 21 has disposed through its thickness dimension a drain hole 141 of small diameter, e.g., 0.035 inch, which is located at an elevation slightly above upper surface 92 of lower web section 93. Drain hole 141 communicates with reservoir 94, and allows water which has been cooled by transferring heat to mirror 79 to be replenished by warm water descending into mirror frame section 75 of mirror assembly body 70 from water supply conduit 104 into reservoir 94.

Because the fore-and-aft thickness of water supply conduit 104 is substantially greater than that of mirror frame assembly reservoir 94, a substantial volume of water may be stored in the conduit for replenishing water which discharges through drain hole 141. The novel construction of mirror 20, which provides a long curved path for convective heat loss from warm water in lower parts of mirror frame section 75, and the close proximity of water-fill aperture 103, from which convective heat must exit reservoir 94, to the surface of a wall on which mirror support stand 22 is mounted, ensures that the rate of convective heat loss from warm water in the water supply conduit 104 and the mirror reservoir 94 is maintained at a low level. The low rate of connective heat loss in turn results in a combination of a mirror assembly and mirror support stand that has a long thermal time constant. Thus, the reflective surface of the mirror plate 79 of the mirror assembly 21 is maintained fogless for more than an adequate time period, e.g., 30 minutes, for a user to complete personal care functions while viewing his or her image in the mirror.

As may be understood by referring to FIGS. 8-10 and 12, reservoir 94 which holds warm water in thermal contact with mirror plate 79 has the shape of a wide rectangular slab which has small uniform fore-and-aft thickness which is joined at the upper end thereof to rearwardly curved water supply conduit 104. The thickness of the water supply conduit 104 tapers from the small value at its lower, inner junction with the reservoir 94 to a substantially larger value at the outer end of the conduit which terminates in water-fill aperture 103, which has a substantially larger rectangular shaped cross-sectional area than the rectangular cross sectioned of the reservoir 94. This novel construction affords the following significant advantages over prior art water-fillable mirrors. First, the substantially larger cross-sectional area of water-fill aperture 103 relative to the cross-sectional area of the reservoir 94 enables the reservoir to be filled rapidly with warm water, e.g., in 1 to 2 seconds as compared to 4 to 6 seconds for prior art mirrors. Second, the large cross-sectional area of water-fill aperture 103, and its location in a plane parallel to and rearward of mirror plate 79 help to keep water from splashing on the mirror plate when reservoir 94 is being filled with warm water.

FIGS. 16-22 illustrate an Automatically Fillable Fogless Shower Mirror which is a modification of the Fogless Shower Mirror described above.

As shown in FIG. 16, an automatically fillable fogless shower mirror 220 according to the present invention includes a fogless shower mirror 20 identical to that described above. The automatically fillable fogless shower mirror 220 includes in addition to the fogless shower mirror 20 an auto-fill adapter 221 for automatically and continuously providing a supply of warm water to the reservoir 94 of mirror 20.

As shown in FIGS. 16-21, auto-fill adapter 221 includes a tubular housing 222. As may be seen best by referring to FIGS. 18 and 19, housing 222 has generally the shape of a stepped diameter, circular cross-section cylindrical shell. Thus housing 222 has a rear internally threaded section 223 which has a helical thread 224 formed in the inner cylindrical wall surface 225 of the rear section. Housing 222 also has a center cylindrically-shaped section 226 which protrudes forward from rear section 223. Center section 226 has a circular diverter hole 227 which is disposed radially through the cylindrical wall 228 of the center section.

As shown in FIGS. 18, 19, and 21, adapter housing 222 also has a front externally threaded cylindrical-shell shaped section 229. Front externally threaded section has a helical thread 230 formed in the outer cylindrical wall surface 231 of the front section.

As may be seen best by referring to FIGS. 17 and 21, adapter housing 222 has a circular cross-section bore 232 which is disposed longitudinally and coaxially through the length of the adapter housing. Bore 232 has a rear entrance opening 233 for threadingly receiving the threaded end of a water supply pipe, and a front exit opening 234 for discharging water into a shower head.

As shown in FIGS. 17, 18, and 21, radially disposed diverter hole 227 communicates with longitudinal bore 232 through adapter housing 222.

As may be seen best by referring to FIGS. 17, 19, and 20, adapter 20 includes a tubular diverter port fitting 235. Diverter port fitting 235 is provided to interconnect in a fluid-tight connection the longitudinal bore 232 through adapter housing 222, with a small diameter bore 236 through an elongated flexible supply tube 237.

As shown in FIG. 20, diverter port fitting 235 has generally the shape of a short tube which has disposed through its length a uniform diameter, circular cross-section bore 239. As shown in FIG. 20, the body of diverter port fitting 235 has a frusto-conic shape. Thus diverter port fitting 235 has a relatively thick-walled base section 240 which tapers to a smaller diameter, upper end part 241. Upper tubular end part 241 of diverter port fitting 235 has an outer diameter of an appropriate size to be receivable in a tight interference fit within a rear entrance opening 242 of bore 236 of flexible water supply tube 237.

As shown in FIG. 16, auto-fill adapter 221 is prepared for use by threadingly tightening rear internally threaded section 223 of the adapter onto the externally threaded outlet end of shower water supply pipe A, and threadingly tightening front externally threaded section 229 of the adapter into the internally threaded inlet fitting of a shower head B. The free end of the flexible supply tube 237 is then inserted into water-fill aperture 103 of reservoir 94 of mirror assembly 21.

Referring to FIGS. 19-21, it may be seen that diverter port fitting 235 has a stepped, smaller diameter tubular end section 243 which extends into bore 232 of adapter housing 222. Thus, as may be understood by referring to FIGS. 16 and 21, when water flows under pressure from shower water supply pipe A to shower head B, a small percentage of the flowing water will be diverted into an inlet port of flexible supply tube 237 and discharged from an outlet port 244 of the flexible supply tube 236 into reservoir 94 of mirror assembly 21. Therefore, when the outer free end of flexible supply tube is inserted into the opening of reservoir 94 of mirror assembly 21, which is held by a support stand 22, the reservoir will be continually replenished with warm water.

According to the invention the ratios of the diameter of the bore 232 through adapter 232 to the diameter of bore 239 through diverter port fitting 235 and bore 236 through flexible water supply tube 237, as well as the length of the water supply tube, are chosen to produce a particular flow rate of water through the water supply tube, for a typical standard water pressure and flow rate through the adapter. Preferably, the flow rate through flexible water supply tube 237 should be slightly greater than the leakage rate of a water supply reservoir, such as through drain hole 141 of reservoir 94 of mirror 20.

In an example embodiment reservoir 94 had a capacity of about 0.155 liter, and a leakage rate through a 0.035-inch diameter drain hole 141 of about 0.0194 liters per minute. For this example embodiment, the flow rate through flexible water supply tube 237 was adjusted to be greater than the leakage rate, i.e., about 0.175 liters per minute. With a water supply pressure of 45-50 psi, the foregoing flow rate through flexible water supply tube 237 was given by an adapter having a bore diameter of 0.1181 inch, a diverter port fitting 235 having a bore diameter of 0.040 inch, and a flexible water supply tube 237 having a bore diameter of 0.0625 inch and a length of 36 inches.

As indicated by the foregoing numerical values of mirror parameters, the discharge rate from water supply tube 237 into reservoir 94 off mirror 21 was about 9 times the rate required to keep the reservoir full, i.e., about 9 times the leakage rate of reservoir 94. Since the 0.040-inch diameter of bore 236 of diverter port fitting 237 has the smallest flow cross-sectional area of any element in the flow path of adapter 221, the discharge rate, which is proportional to the smallest cross-sectional area, may be reduced by decreasing that bore diameter. Thus increasing the ratio of the diameter of main water flow bore 232 through adapter 222 to the diameter of bore 236 through diverter port fitting 237 from a value of (0.1181 inch/0.040 inch)=2.9 by a factor of √2=1.414, by reducing the diverter fitting bore diameter from 0.040 inch to 0.028 inch would increase the diameter ratio by a factor of −2 to 4.1, and decrease the discharge rate by a factor of 2 to about 0.175 lpm/2=0.0875 lpm. Similarly, the diameter of bore 236 could be reduced by a factor of 2. to about 0.020 inch, to decrease the discharge rate by a factor of 4. Thus for the present example, an approximate acceptable range of values of the ratio between the diameter of main water flow bore 232 through adapter 222 to the diameter of bore 236 through diverter port fitting 235 would be from about 2.9 to 5.8.

The minimum diameter of bore 236 of water supply tube 237 would preferably be sufficiently large to provide a discharge rate sufficient to quickly fill a reservoir with warm water when a shower is first turned on, and sufficiently large to prevent calcium deposits formed in the bore after continued use from appreciably reducing the discharge rate. For the foregoing reasons, the ratio of the discharge rate of water from water supply tube 237 to the leakage rate of a particular reservoir preferably would lie in the approximate range of 8:1 to 2:1. For the parameter values of the present example, including the range of water pressures tested, the foregoing range of discharge values would be provided by an adapter in which the ratio of the diameter of main water flow bore 232 through adapter 222 to the diameter of bore 236 through diverter port fitting 237 lies in the approximate range of 2.9 to 5.8.

What is claimed is:

1. An automatically filling mirror having a water reservoir which is automatically fillable with warm water to heat a reflective surface of the mirror and thereby resist fogging caused by condensation of water vapor on said reflective surface, said mirror including a mirror assembly comprising;
   a. a reflective mirror plate,
   b. a hollow body which supports said reflective mirror plate,
   c. a water reservoir for warm water located within said hollow body, said reservoir being in thermally conductive contact with said reflective mirror plate,
   d. a water supply conduit in fluid-tight connection with said water reservoir, said water reservoir including a cavity formed between a front wall which supports said reflective mirror plate, a rear wall spaced rearward of said front wall, and left and right side walls, said water supply conduit being located above said water reservoir and having at an upper end thereof a water-fill aperture for receiving warm water into said water supply conduit and said water reservoir, and
   e. an automatic water-filling adapter having a tubular housing which is installable between an outlet port of a shower water supply pipe and a shower head, the tubular adapter having a smaller diameter flexible water supply tube which protrudes from the housing and has a small diameter bore that has an inlet opening which communicates with a larger diameter main water-flow bore through the adapter housing said adapter being effective in diverting at a small rate of flow warm water into the flexible water supply tube to be discharged from an outlet opening at a distal end of the tube, said distal end of said tube being removably insertable into said water-fill aperture of said reservoir, thereby automatically filling said reservoir with a continuous supply of warm water; said adapter including a diverter port fitting for anchoring said flexible water supply tube to said tubular housing, said diverter port fitting having a tubular frusto-conic shape including an upper end port which has a diameter enabling said upper end port to be receivable in a tight interference fit within said inlet opening of said bore through said flexible water supply tube, said fitting having an outer diameter which tapers to a relatively larger diameter base, said tubular housing of said automatic-filling adapter having a rear section fastenable to a water supply pipe, a front section fastenable to a shower head, and a center section located between said rear and front sections, a main water-flow bore disposed longitudinally through the length of said housing, and a diverter hole disposed radially through said center section, said diverter hole communicating with said main water-flow bore and effecting communication between said longitudinally disposed main water-flow bore and a smaller diameter diverter bore disposed through said flexible water supply tube.

2. The mirror of claim 1 wherein at least one of said front and rear sections of said housing is threaded.

3. The mirror of claim 1 wherein the ratio of the diameter of said main water flow bore through said adapter to the minimum water flow bore diameter of any element between said diverter port and the discharge of said flexible water supply tube lies in the approximate range of 5.8:1 to 2.9:1.

4. The mirror of claim 1 wherein the ratio of the diameter of said main water flow bore through said adapter to the bore diameter of said diverter port fitting lies in the approximate range of 5.8:1 to 2.9:1.

5. The mirror of claim 1 wherein said diverter port fitting has protruding rearward from said base section a smaller diameter cylindrically shaped tubular end section.

6. The mirror of claim 1 wherein said water reservoir is provided with a drain hole which penetrates said cavity and communicates with the exterior of said mirror.

7. The mirror of claim 1 wherein the ratio of the diameter of said main water-flow bore through said adapter to the minimum water flow bore diameter of any element between said diverter port and the discharge opening of said flexible water supply tube is selected to provide a water discharge rate from said flexible water supply at least as great as the leakage rate of water from said reservoir through said drain hole.

8. The mirror of claim 7 wherein the ratio of said discharge rate to said leakage rate lies in the approximate range of 2:1 to 8:1.

9. The mirror of claim 8 wherein the ratio of the diameter of said main water flow bore through said adapter to the bore diameter of said flexible water supply tube lies in the approximate range of 5.8:1 to 2.9:1.

10. An automatic water-filling adapter for providing warm water to the reservoir of a fogless shower mirror, said adapter comprising:
    a. a tubular housing having an inlet port connectable in fluid tight connection to a source of warm water, and an outlet port connectable in fluid tight connection to a shower head, said housing having disposed through its length a longitudinally disposed main water-flow bore,
    b. a diverter port disposed transversely through a wall of said tubular housing, said diverter port having a diverter bore which communicates in fluid tight connection with said main water-flow bore through said housing,
    c. a flexible water supply tube disposed through said diverter bore, said flexible water supply tube having through its length a diverter bore which has an inlet opening that is in fluid tight communication with said longitudinally disposed main water flow bore through said housing, and an outlet opening in a distal end of said flexible water supply tube, said distal end being insertable into a water-fill aperture of a water reservoir of a mirror, and
    d. said tubular housing of said automatic-filling adapter having a rear section fastenable to a water supply pipe, a front section fastenable to a shower head, and a center section located between said rear and front sections, a main water-flow bore disposed longitudinally through the length of said housing, and a diverter hole disposed radially through said center section, said diverter hole communicating with said water flow bore and enabling communication between said longitudinally disposed water flow bore and a smaller diameter diverter bore disposed through said flexible water supply tube, and e. a diverter port fitting for anchoring said flexible water supply tube to said tubular housing, said diverter port fitting having a tubular frusto-conic shape including an upper end part which has a diameter enabling said upper port to be receivable in a tight interference fit within a rear entrance opening of said bore through said flexible water supply tube, said fitting having an outer diameter which tapers to a relatively larger diameter base.

11. The automatic water-filling adapter of claim 10 wherein at least one of said front and rear sections of said housing is threaded.

12. The automatic water-filling adapter of claim 10 wherein said diverter port fitting has protruding rearward from said base section a smaller stepped diameter cylindrically shaped tubular end section.

13. The automatic water-filling adapter of claim 10 wherein the ratio of the diameter of said main water-flow bore through said adapter to the smaller of the diameter of said bore through said diverter port fitting and the bore through said flexible water supply tube is selected to provide a water discharge rate from said flexible water supply at least as great as the leakage rate of water from said reservoir of a mirror which the adapter is intended to be used with.

14. The automatic water-filling adapter of claim 13 wherein the ration of said discharge rate to said leakage rate lies in the approximate range of 2:1 to 8:1.

15. The automatic water filling adapter of claim 14 wherein the ratio of the diameter of said main water flow bore through said adapter to the minimum water flow bore diameter of any element between said diverter port and the discharge opening of said flexible water supply tube lies in the approximate range of 5.8:1 to 2.9:1.

16. The mirror of claim 14 wherein the ratio of the diameter of said main water flow bore through said adapter to the bore diameter of said diverter port fitting lies in the approximate range of 5.8:1 to 2.9:1.

* * * * *